United States Patent [19]

Yamaguchi et al.

[11] Patent Number: 5,268,883
[45] Date of Patent: Dec. 7, 1993

[54] TRACK ACCESS DEVICE AND TRACKING CONTROL DEVICE

[75] Inventors: Hiroyuki Yamaguchi, Hirakata; Mitsuro Moriya, Ikoma, both of Japan

[73] Assignee: Matsushita Electric Industrial Co., Ltd., Osaka, Japan

[21] Appl. No.: 948,463

[22] Filed: Sep. 22, 1992

Related U.S. Application Data

[63] Continuation of Ser. No. 597,722, Oct. 16, 1990, abandoned.

[30] Foreign Application Priority Data

Oct. 16, 1989 [JP]  Japan ................................. 1-268448

[51] Int. Cl.⁵ .............................................. G11B 7/00
[52] U.S. Cl. ................................. 369/32; 369/44.28; 369/44.29; 369/58; 369/124
[58] Field of Search ............ 369/32, 44.28, 44.29, 369/44.27, 58, 124, 54, 44.32, 47, 48, 49

[56] References Cited

U.S. PATENT DOCUMENTS

| | | | |
|---|---|---|---|
| 4,059,841 | 11/1977 | Bricot et al. | |
| 4,106,058 | 8/1978 | Romeas et al. | 358/128 |
| 4,332,022 | 5/1982 | Ceshkovsky et al. | 369/44 |
| 4,866,688 | 9/1989 | Ohtake et al. | 369/44.28 |
| 4,989,190 | 1/1991 | Kurde et al. | 369/58 |

FOREIGN PATENT DOCUMENTS 0232134  8/1987  European Pat. Off.
0242215  10/1987  European Pat. Off.

*Primary Examiner*—Aristotelis Psitos
*Assistant Examiner*—Muhammad N. Edun
*Attorney, Agent, or Firm*—Wenderoth, Lind & Ponack

[57] ABSTRACT

A data recording/reproducing device has a pickup for recording/reproducing information on disk which has tracks formed on a recording area and a ROM area. A track access device for moving the pickup from a starting track at which the pickup is presently located to a target track includes a moving arrangement for moving the pickup in a direction crossing tracks, a tracking error signal generator for generating an analog signal representing the crossing of the tracks by the pickup, and position detector for detecting the position of the pickup in either one of the recording and ROM areas. Also, for processing the tracking error signal, an amplifier, an offset adder and hysteresis comparator are provided, each having differing operating parameters when the pickup is located in the recording area and then when it is located in the ROM area.

17 Claims, 7 Drawing Sheets

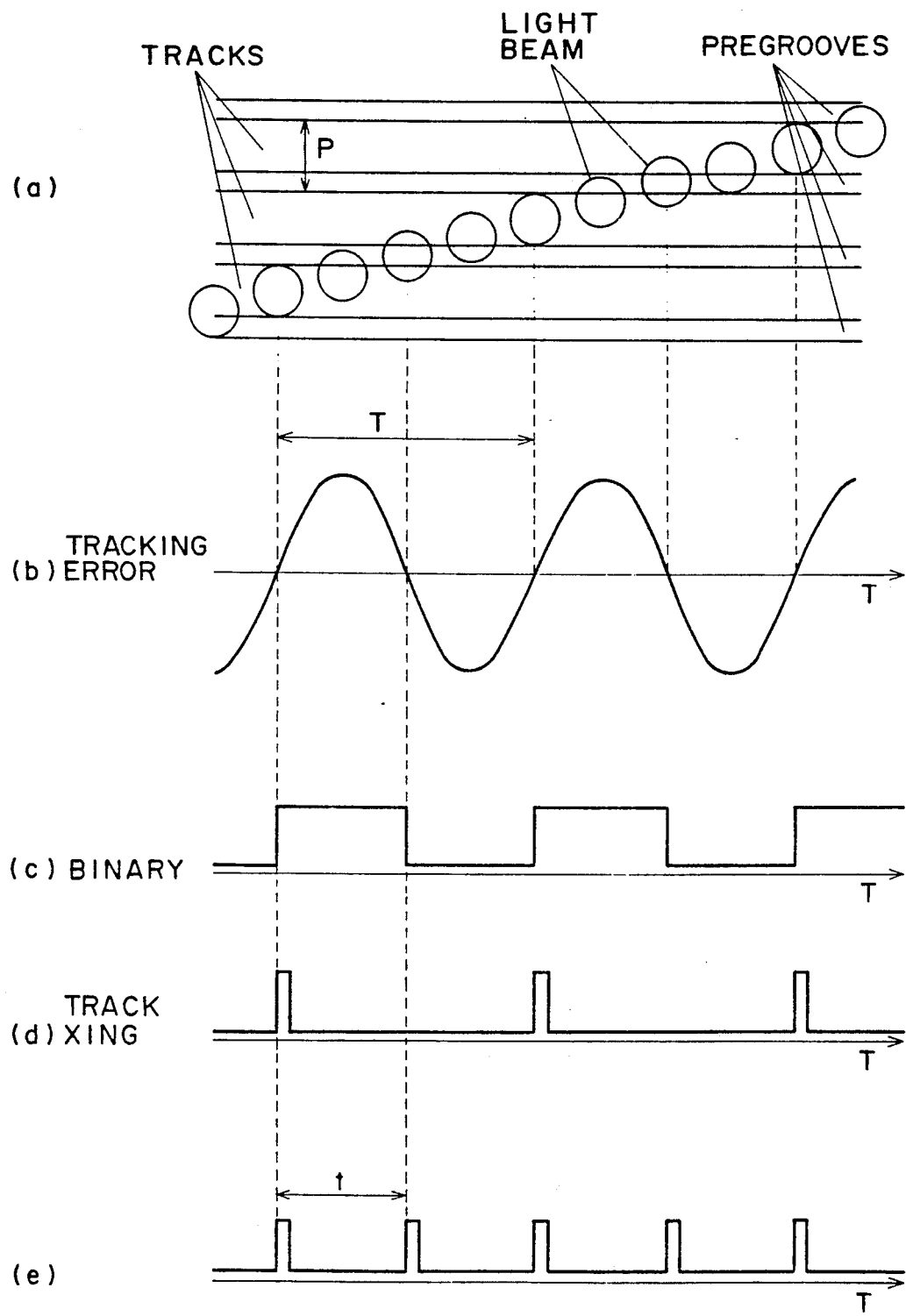

RECORDING AREA RD
ROM AREA RM

PITS
PREGROOVES
RM
RD
TRACKS

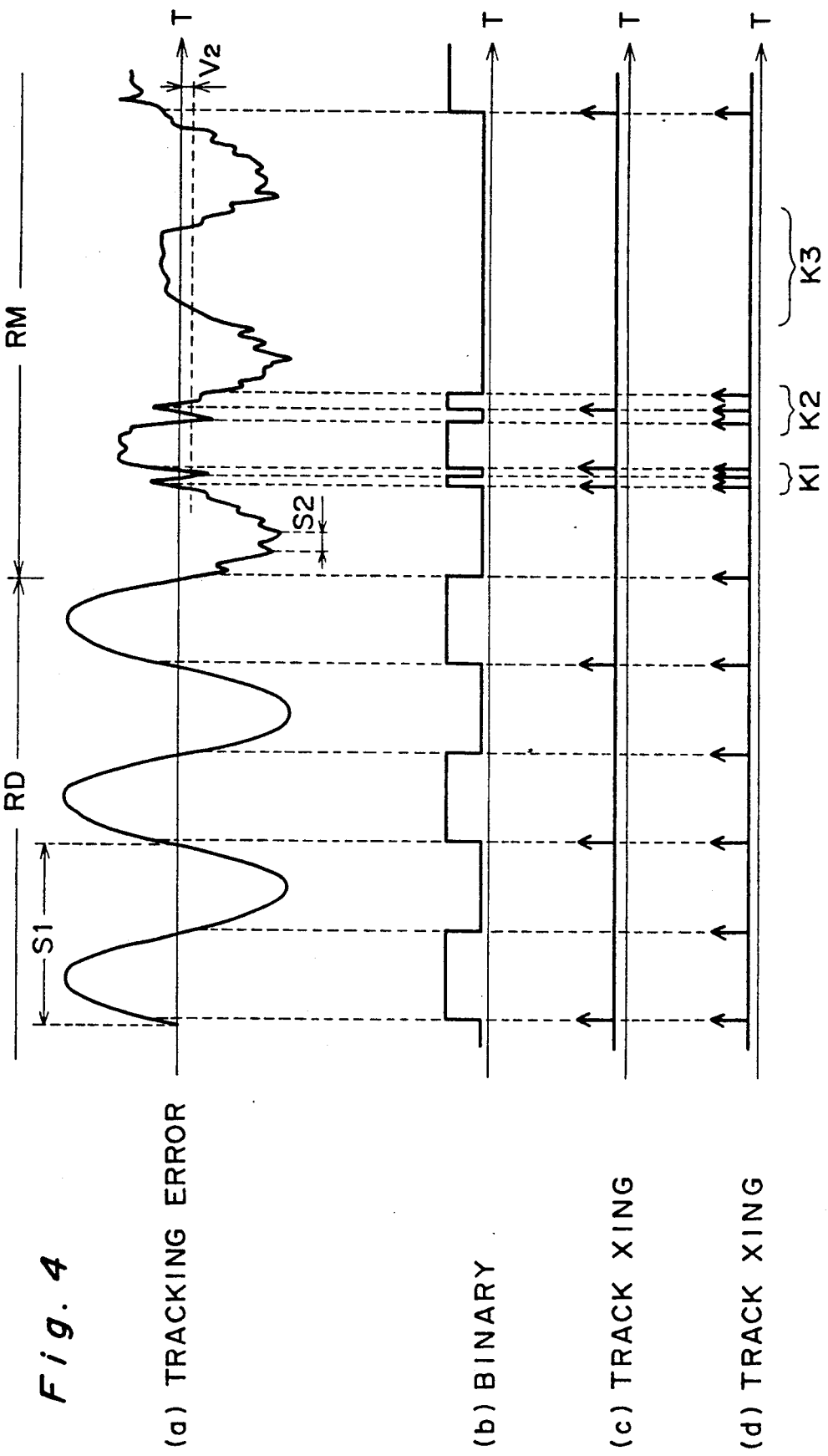

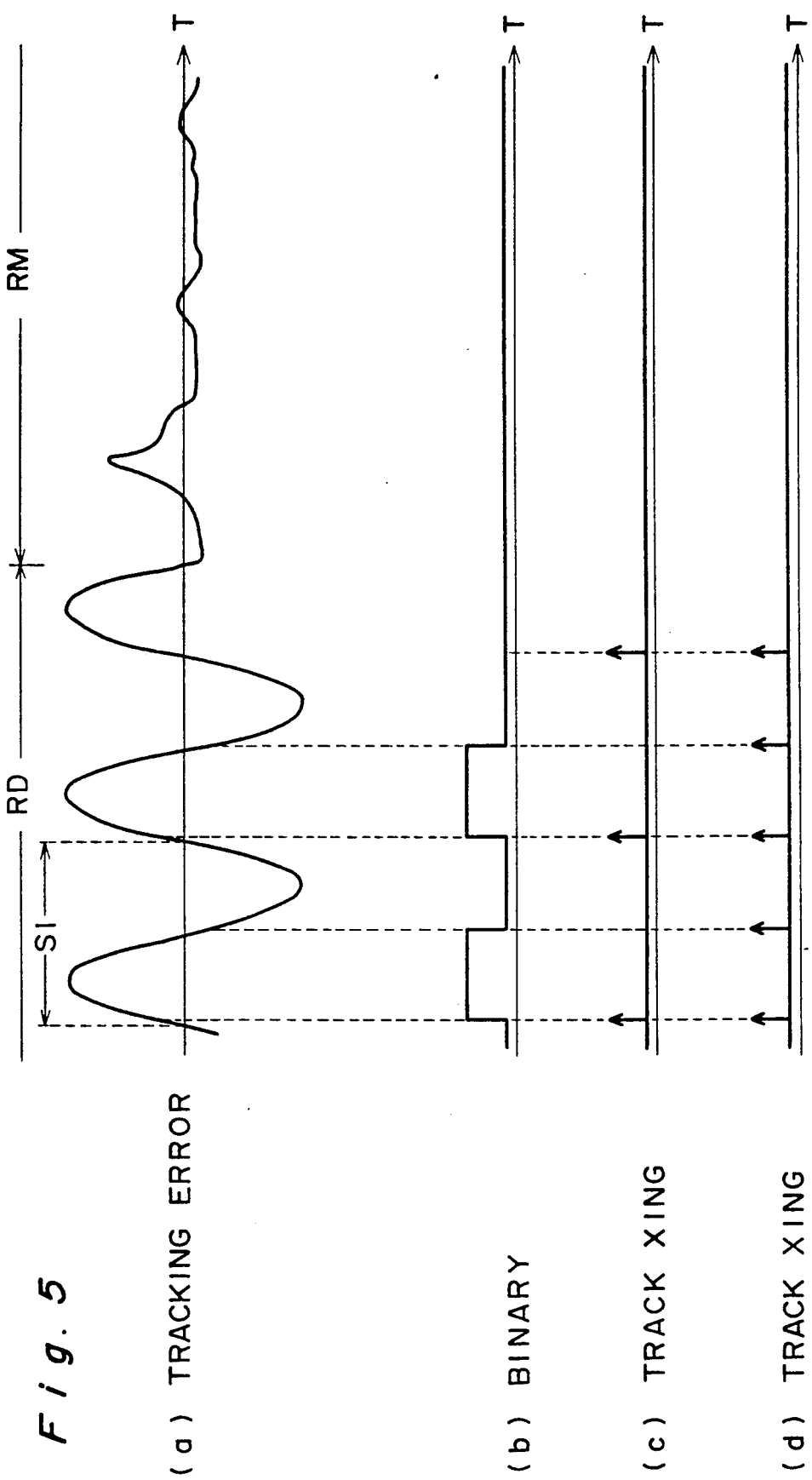

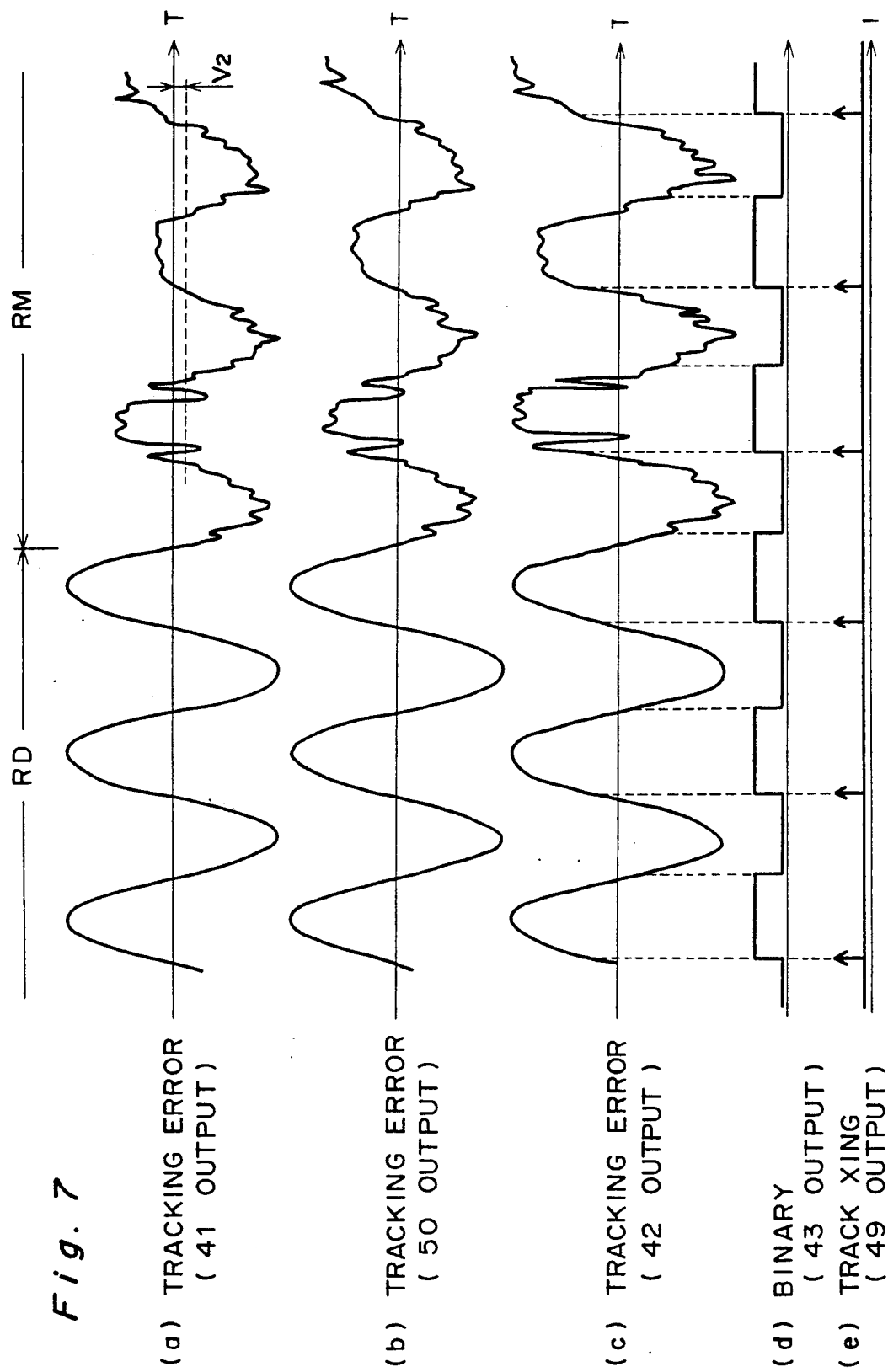

TRACK ACCESS DEVICE AND TRACKING CONTROL DEVICE

This application is a continuation of application Ser. No. 07/597,722, filed Oct. 16, 1990, now abandoned.

BACKGROUND OF THE INVENTION

1. Field of the Invention

The present invention relates to a data recording/reproducing device and, more particularly, to a track access device for accessing a desired track on a recording medium, such as disc, having a large number of tracks, and also to a tracking control device.

2. Description of the Prior Art

An optical recording and reproducing device is known which utilizes a recording medium having a number of tracks formed thereon.

The optical recording and reproducing device is arranged to concentrate light beams generated from a light source using a condensing lens and to irradiate the same onto an information recording medium having tracks so as to record and reproduce signals. The information recording medium, such as a disk, is made by forming a film of material which is capable of optically recording and reproducing on a substrate surface concentric circular tracks of uneven structure using a vapor deposition method, etc. As the light source, for example, a semiconductor laser diode is used. The reproduction of signals is performed by setting the light beam at a relatively weak predetermined light intensity and by reading out the intensity of the reflected light from the disk. The recording of signals is conducted by modulating the light beam intensity in accordance with each signal to be recorded.

In such an optical recording and reproducing device, a focusing control is provided for controlling the concentration of light beams onto the recording material film approximately maintain a predetermined focused state at all times. Furthermore, a tracking control is provided so that the light beams are incident on a predetermined track at all times.

In the optical recording and reproducing device, in order to allow the light beam to randomly access a track on the disk, a track access control is effected. The track access control is effected by making the tracking control non-operative, moving the light beam radially on the disk towards the target track, and again actuating the tracking control when the light beam has reached the target track. The preceding technology regarding track access is disclosed, for example, in U.S. Pat. No. 4,106,058 or No. 4,332,022, etc.

One of the important factors in the track access control is the velocity of the light beam when it crosses the tracks, that is, the tracking pull-in velocity. The control band of the tracking control is limited, and normally in the range of several KHz. Therefore, when the tracking pull-in velocity is too fast, the tracking control into the target track fails. On the contrary, when the tracking pull-in velocity is too slow, it takes time to access the target track.

Therefore, the velocity control for controlling the velocity of the light beam is effected when moving the light beam radially on the disk in the track accessing process. The object of the velocity control is to accurately control the track pull-in velocity so as to achieve a stable pull in of the tracking control into the target track.

The track access is effected by moving the light beam radially on the disk so that the pull-in velocity of the light beam is set to a predetermined reference velocity determined corresponding to the current position of the light beam along the radial direction of the disk.

The light beam moving velocity necessary to effect the velocity control is detected in accordance with the period of the track crossing signal generated when the light beam crosses tracks. For the track access operation, the current position of the light beam is obtained by counting the number of track crossing signals from the starting track from which the track access operation starts.

In FIG. 2, the tracking error signal and the track crossing signal generated when the light beam crosses tracks in the radial direction of the disk are shown. Particularly, FIG. 2(a), shows the state where the light beam crosses tracks on the disk and FIG. 2(b) shows the tracking error signal. On the disk, pregrooves of uneven structure having a optical depth of approximately $\lambda/8$ ($\lambda$ is a wavelength of the light beam) are formed at a predetermined pitch. A band between adjacent pregrooves is a track where information is recorded.

A disk of such a structure is called an on-land disk. In an on-land disk, the tracking error signal can be generated by a push-pull method as shown in FIGS. 2(a) and 2(b). Since the push-pull method is described in detail, for example, in Japanese Patent Publication No. 59-9085 issued Feb. 29, 1984 or in French Patent No. 7529707 issued Sep. 29, 1975, the explanation thereof is omitted.

FIG. 2(c) depicts is a digital signal obtained by digitalizing the tracking error signal with the use of a hysteresis circuit, and FIG. 2(c) depicts the edge detection signal obtained by detecting the leading edge of the digital signal. Each pulse in the edge detection signal occurs when the light beam crosses the center of each track, and therefore, it represents the track crossing signal. Therefore, the edge detection signal shown in FIG. 2(d) is hereinafter referred to as a track crossing signal. Therefore, the count obtained by counting the track crossing signals from the starting of the track access operation represents the current position of the light beam. Such a position detection during the track accessing according to this method is referred to as the groove count method.

Also, since tracks are arranged approximately at the same pitch P in the radial direction of the disk, the light beam radial velocity V is obtained by $$V = P/T,$$

in which T is a period of one cycle of the track crossing signal.

The radial velocity detection according to this method is referred to as the period measurement type detection method.

In FIG. 2(e), pulses having a period t are shown which represent leading and trailing edges of the pulse shown in FIG. 2(c). Thus, the radial velocity of the light beam can be given as $$V = P/2t.$$

There are two methods for writing information onto the disk: one is to change the intensity of the light beam in accordance with the information to be recorded; and the other is to form pits during the manufacture of the disk along the tracks, as realized in compact disks. The latter method has an advantage in that many copies can be made at a low cost by the mastering replication technology used in the compact disk, and is suitable for disk storing of software such as encyclopedias, dictionaries, atlases, and operation systems.

In FIG. 3(a), a disk is shown which has an outer recording area RD for recording data by modulating the intensity of the light beam in accordance with to be recorded information, and an inner ROM area RM in which information is recorded in advance by the formation of a number of pits. Also, in FIG. 3(b), a fragmentary enlarged view is depicted, particularly showing the boundary portion between the recording area RD and the ROM area RM. As is apparent from FIG. 3(b), the tracks in the recording area RD have a relatively even surface, while the tracks in the recording area RM have an uneven surface.

In FIG. 4, signals are shown which are generated when the light beam crosses the tracks in the radial direction of the disk in the recording area RD and also in the ROM area RM. Specifically, FIG. 4(a) shows the tracking error signal, and FIG. 4(b) shows the binary signal obtained by digitalizing the tracking error signal using a hysteresis circuit. FIG. 4(c) shows the track crossing signal obtained by detecting the leading edges of the binary signal, and FIG. 4(d) shows pulses obtained by detecting the leading and trailing edges of the binary signal. In FIG. 4, the abscissa represents time and narrow pulses are shown by arrows.

When the period $S_2$ of the sinusoidal noise signal imposed on the tracking error signal in ROM area RM is compared with the period $S_1$ of the tracking error signal in the recording area RD, a relationship $$S_1 >> S_2$$

is obtained. The short period S2 of the noise signal in the ROM area is caused by the deterioration of the S/N ratio in the tracking error signal which is erroneously modulated by the presence of pits. The amplitude of the tracking error signal in the ROM area is decreased due to the presence of the pits, and an offset amount $V_2$ is produced due to the non-uniformity of the pit shapes. Accordingly, at time regions $K_1$ and $K_2$, a pulsating noise signal having an substantially shortened period is generated when the track error signal is changed to the binary signal.

Furthermore, in the time region $K_3$, since the amplitude of the signal is substantially reduced, the hysteresis circuit fails to detect the low amplitude tracking error signal, and therefore, no pulse will be present in the binary signal in the region $K_3$. Thus, the pulse spacing period is lengthened.

Since the radial velocity of the light beam is detected from the period of the track crossing signal, an erroneous detection of the light beam radial velocity takes place. As a result, an abnormal velocity variation takes place and the track pull in of the tracking control may fail.

Furthermore, the position of the light beam is erroneously detected, and the track detection operation may be terminated at a position other than the target track. As a result, it becomes necessary to again conduct the track access operation in order to correctly reach the target track, resulting in a drawback in that the track access time becomes longer.

In order to further shorten the time required for the track access, it is necessary to move the light beam at a high radial velocity. In FIG. 5 depicts the tracking error signal and the track crossing signal generated by the prior art track access device when the light beam is moved at a high radial velocity so that the period $S_1$ of the tracking error signal becomes nearly equal to the period $S_2$ of the signal recorded in the ROM area. In FIG. 5(a) shows the tracking error signal at such a condition, FIG. 5(b) shows the binary signal obtained by digitalizing the tracking error signal using a hysteresis circuit, and FIG. 5(c) shows the track crossing signal obtained by detecting the rising edges of the binary signal. Furthermore, FIG. 5(d) shows the signal obtained by detecting the rising and falling edges of the signal of FIG. 5(b). The period $S_2$ of the signal recorded in the ROM area and the period $S_1$ of the tracking error signal become nearly equal to each other. As a result, the tracking error signal may not be properly formed in the ROM area.

Also, since the offset and the decrease of amplitude of the tracking error signal substantially occur in the ROM area as compared with the recording area, an offset in the tracking control and a decrease in loop gain take place. Therefore, in the final stage of the track access when the light beam reaches the target track and actuates the tracking control, the pull in of the tracking control into the target track has often failed.

SUMMARY OF THE INVENTION

An essential object of the present invention is to provide a track access device which can access the target track stably at a high velocity even in a disk having a ROM area.

In order to accomplish the above-mentioned object, according to the present invention, a track access device comprises: a gain switch circuit which is capable of switching the amplification ratio for amplifying the tracking error signal, a binary circuit which is capable of switching the hysteresis amount used when digitalizing the tracking error signal, an offset adding circuit which is capable of switching the offset to be added to the tracking error signal, and an reference velocity generator which is capable of switching to a predetermined reference velocity in accordance with the current position of the light beam during the track access operation. The track access device is arranged to switch the amplification ratio of said gain switch circuit, the hysteresis amount of said binary circuit, the offset adding amount of said offset adding circuit and the reference velocity to be outputted by said reference velocity generator at the time point when the light beam crosses the boundary between the ROM area and the recording area.

By the above-mentioned arrangement, since the amplification ratio of the tracking error signal in the ROM area can be increased, the amplitude of the tracking error signal becomes approximately equal to that in the recording area. Therefore, the pulse formation failure in the output signal of the binary circuit due to the effect of pits in the ROM area can be prevented. Furthermore, since the loop gain of the tracking control system in the ROM area can be made approximately equal to that in the recording area, it is possible to stably perform the pull-in operation into the tracking control.

Furthermore, since the hysteresis amount of the binary circuit can be increased in the ROM area, the occurrence of a pulse noise signal in the output of the binary circuit due to the presence of pits in the ROM area can be prevented.

Moreover, since the offset taking place in the tracking error signal can be canceled by switching the offset adder circuit to add an offset amount to the tracking error signal in the ROM area, the pulse formation failure in the output signal of the binary circuit due to the effect of pits in the ROM area can be prevented. Similarly, the pull in to the tracking control can be stably carried out.

Moreover, since in the ROM area, the reference velocity can be reduced and the moving radial velocity of the light beam can be reduced, the misforming of the tracking error signal due to the effect of pits arising from an excessively fast radial velocity of the moving light beam can be prevented.

By the above-mentioned arrangement, even in a disk having a recording area and a ROM area, an abnormal velocity change of the moving light beam caused by an erroneous radial velocity detection of the moving light beam due to the pits in the ROM area, and the increased track access time caused by erroneous position detection of the light beam can be prevented. Also, the failure of the pull in of the tracking control in the target track can be prevented so that the track access of the desired track can be made rapidly and stably.

BRIEF DESCRIPTION OF THE DRAWINGS

These and other objects and features of the present invention will become apparent from the following description taken in conjunction with the preferred embodiment thereof with reference to the accompanying drawings, in which:

FIGS. 2(a)-2(e) depict the tracking error signal and the track crossing signal when the light beam crosses tracks;

FIGS. 4(a)-(d) depict the tracking error signal and the track crossing signal obtained by the prior art circuit when the light beam crosses to tracks in the recording area and the ROM area;

FIGS. 5(a)-(d) depict the tracking error signal and the track crossing signal obtained by the prior art circuit when the light beam crosses the tracks in the recording area and the ROM area at a high radial velocity;

FIGS. 7(a)-(e) depict the tracking error signal and the track crossing signal obtained by the circuit of FIG. 1 when the light beam crosses the tracks in the recording area and the ROM area.

DETAILED DESCRIPTION OF THE PREFERRED EMBODIMENT

Figure 1:
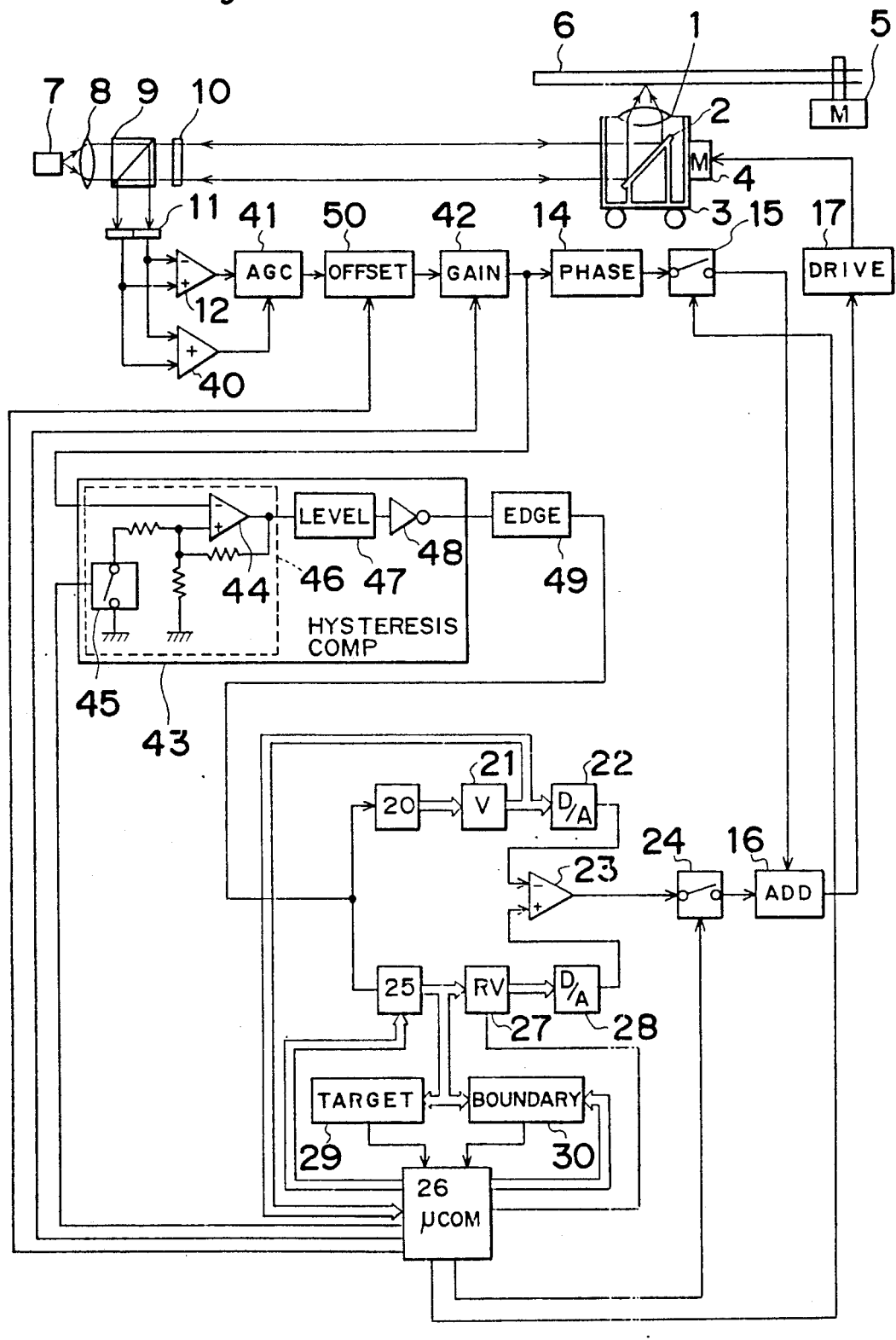
FIG. 1 is a block diagram showing a preferred embodiment of the track access device according to the present invention.

Referring to FIG. 1, a block diagram of a track access device according to a preferred embodiment of the present invention is shown which is equipped in a data recording/reproducing device.

Figure 3A:
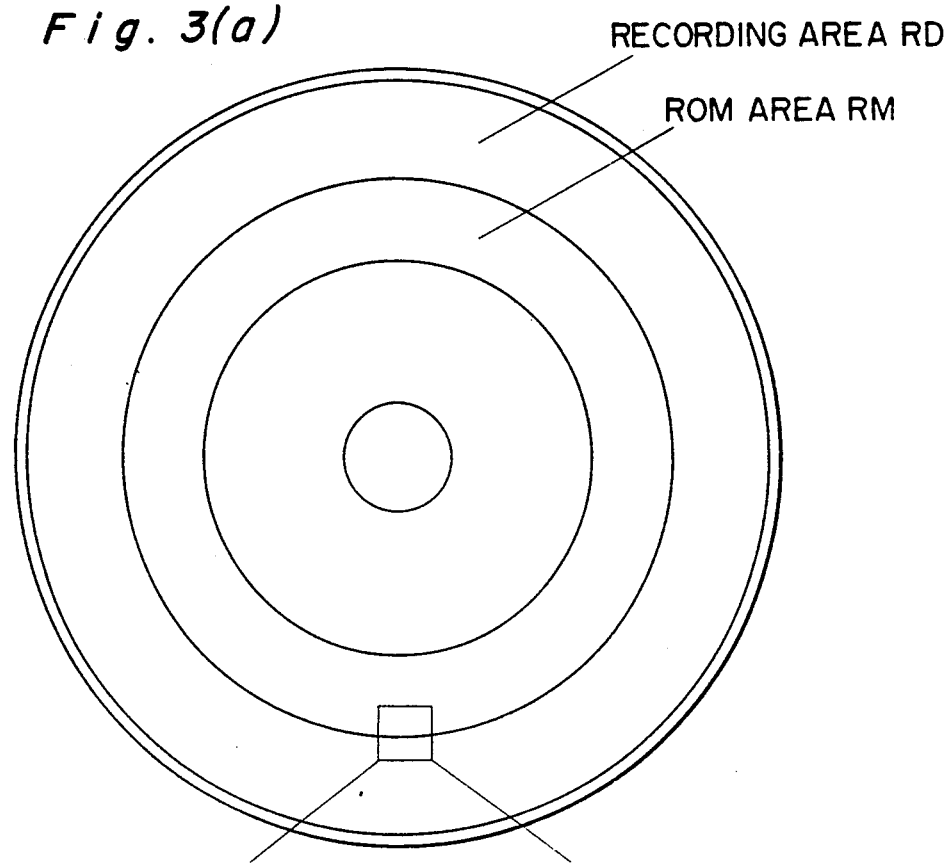
FIGS. 3(a)-(b) are diagrammatic views showing the constitution of a disk having a recording area and a ROM area.
Figure 3B:
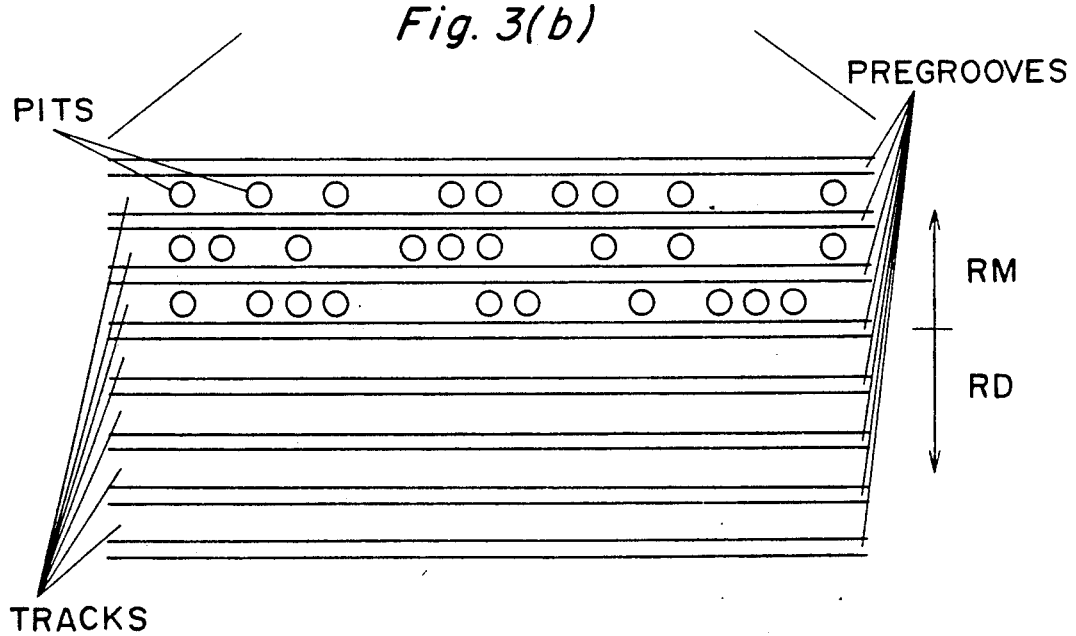

A disk 6 having a recording area RD and a ROM area RM, such as the one described above in connection with FIG. 3, is mounted on a disk holder (not shown) which is rotated by a motor 5.

A pickup arrangement for reading/writing information on the disk is formed by a light source arrangement irradiating a light beam on the disk. The light source arrangement includes a carrier 3 being mounted thereon a condensing lens 1 and a reflection mirror 2. The carrier 3 is driven approximately in the radial direction of a disk 6 by a voice coil motor 4 driven by a drive circuit 17. A light source such as a semiconductor laser 7 generates a laser light beam which passes through a collimator lens 8 for collimating the light beam. The light beam having passed through the collimator lens 8 passes through a prism beam splitter 9 and through a $\frac{1}{4} \lambda$ plate 10 ($\lambda$ is the wavelength of the laser beam) and is irradiated onto the reflection mirror 2 mounted on the carrier 3. The light beam reflected by the reflection mirror 2 is concentrated by the condensing lens 1 and is irradiated onto the disk 6.

The light beam reflected from the disk 6 returns back through the condensing lens 1 and is reflected by the reflection mirror 2. The light beam reflected by the reflection mirror 2 passes through the $\frac{1}{4} \lambda$ plate 10 and is reflected by the prism beam splitter 9 and impinges on a light receiving surface formed by a divided photo detector 11 having two photosensitive segments. A line dividing the photo detector 11 extends in alignment with the extending direction of the track on the light receiving surface.

Both outputs from the divided photo detector 11 are applied to a differential amplifier 12 and to an adder 40 so as to calculate the difference and the sum of the outputs. The output of the differential amplifier 12 is applied to a numerator input terminal of an AGC circuit 41, and the output of the adder 40 is applied to a denominator input terminal of AGC circuit 41. The AGC circuit 41 is arranged to output a quotient obtained by dividing an input signal of the numerator input terminal by an input signal of the denominator input terminal. As is apparent to those skilled in the art, an output signal of the AGC circuit 41 is a tracking error signal, such as shown in FIG. 7(a). The purpose for performing the dividing operation in the AGC circuit 41 is to prevent an amplitude variation of the tracking error signal caused by a variation in the light emitting power of the light source 7.

The tracking error signal is inputted to the voice motor coil 4 through an offset adding circuit 50, a gain switch circuit 42, a phase compensation circuit 14, a switch 15, an adder 16 and a drive circuit 17 to constitute tracking control.

Offset adding circuit 50 switches, in accordance with an offset switch signal from a microcomputer 26, between a non-adding state in which the tracking error signal from AGC 41 is directly passed to gain switch circuit 42, and an adding state in which the tracking error signal from AGC 41 has $-V_2$ added thereto to counterbalance the undesirable offset amount in the tracking error signal produced during the tracking control in the ROM area RM.

Gain switch circuit 42 switches between a low amplification state in which the tracking error signal is amplified by a standard or low amplification ratio and a high amplification state in which the tracking error signal is amplified by a high amplification ratio, in accordance with a gain switch signal from the microcomputer 26.

Phase compensation circuit 14 is provided to control the stability of the tracking control, and switch 15 is provided to switch between the operation and non-operation of the tracking control.

The tracking error signal produced from gain switch circuit 42 is also applied to an edge detection circuit 49 through a binary circuit 43. Binary circuit 43 produces a binary signal, such as shown in FIG. 7(d), based on the output signal of the gain switch circuit 42. Binary circuit 43 includes a hysteresis comparator 46 having an operation amplifier 45 and a switch 45, a level conversion circuit 47 and an invertor 48. The signal produced from gain switch circuit 42 is converted to binary form by the hysteresis comparator 46. The level of the binary signal is converted to a preferable level for being processed in the binary circuit 43 by the level conversion circuit 47, and the thus level converted signal is inverted in polarity by invertor 48.

Hysteresis comparator 46 is so arranged that the hysteresis comparator levels can be changed between two setting using the switch 45 controlled by microcomputer 26. When switch 45 is on, the hysteresis amount (i.e., the difference between the higher reference level and the lower reference level of the comparator 46) is decreased, and when it is off, the hysteresis amount is increased.

The output of the binary circuit 43 is applied to edge detection circuit 49 which detects the leading edge of the binary signal and supplies the track crossing signal, such as shown in FIG. 7(e), to a timer 20 and also to a counter 25.

Timer 20 measures the period of the track crossing signal from edge detection circuit 49 and produces the measured time DT in a binary form. The signal representing the measured time DT is applied to a velocity calculation circuit 21 which calculates the radial velocity DV of the track crossing light beam in accordance with the following equation:

$$DV = P/DT$$

wherein P is a track pitch.

The radial velocity DV of the track crossing light beam is sampled every time the light beam crosses a track. Therefore, the velocity calculation circuit 21 is arranged to hold the sampled radial velocity DV at least until the next sampling takes place.

The radial velocity DV produced from velocity calculation circuit 21 is converted into an analog signal in a D/A converter 22 and is in turn applied to one input of a differential amplifier 23. The output signal of the differential amplifier 23 is applied to the voice coil motor 4 through a switch 24, an adder 16 and the drive circuit 17 for the velocity control. Switch 24 is provided to switch between the operation and non-operation of the velocity control.

The track crossing signal from edge detection circuit 49 is also applied to a down-counter 25 which counts down each time the beam crosses a track. When the track access operation is requested, microcomputer 26 presets the down-counter 25 with a number representing the number of tracks between the present track at which the beam is incident and a target track.

Figure 6:
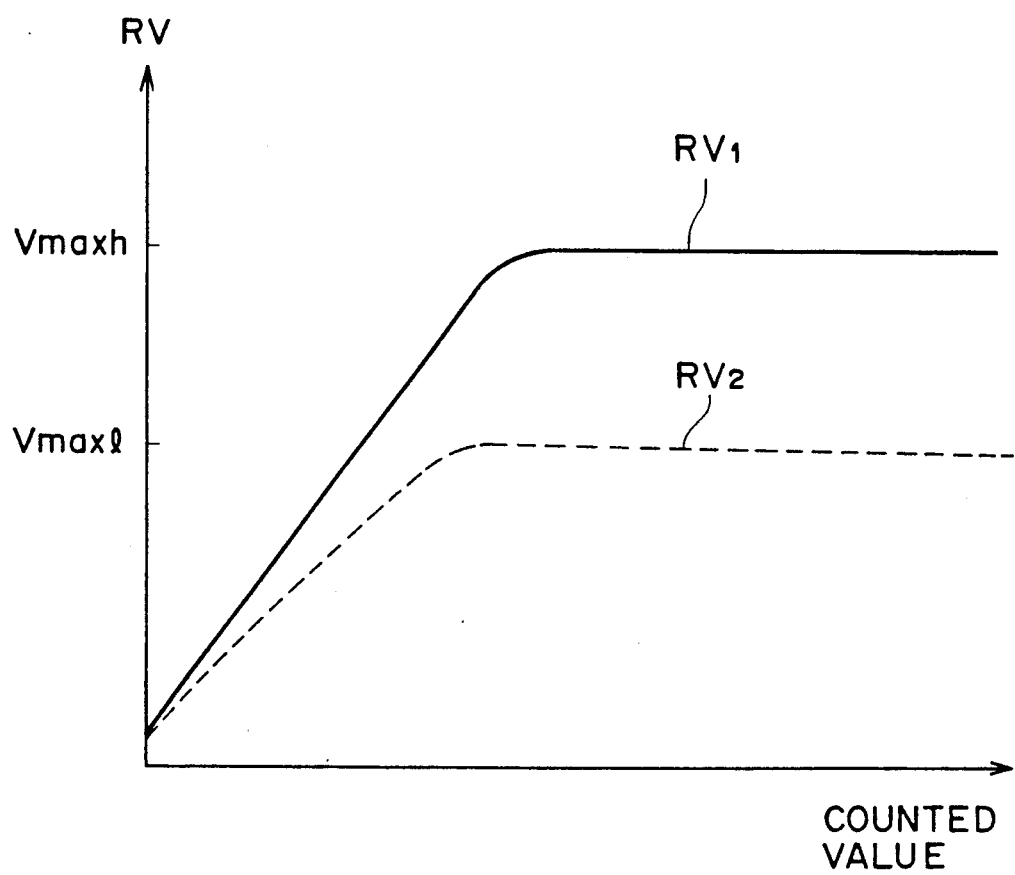
FIG. 6 is graph showing the relationship between the count value of the counter and the reference velocity.

The counted value of counter 25 is applied to a reference velocity generator 27 having a memory such as ROM for storing a table or a graph such as shown in FIG. 6 for producing an appropriate track crossing reference velocity RV relative to the distance to the target track. After having been advanced to a position within a predetermined distance from the target track, the track crossing reference velocity RV becomes small, as the distance to the target track becomes short. As will be described in detail later, the reference velocity generator 27 is capable of generating two different reference velocities $RV_1$ and $RV_2$ which are for the recording area RD and ROM area RM, respectively.

The reference velocity RV from reference velocity generator 27 is converted to an analog value by a D/A convertor 28, and is applied to another input of differential amplifier 23 so as to thereby control the drive circuit 17 to drive the carrier 3 at a radial velocity equal to the reference velocity RV.

The counted-down value of counter 25 is also applied to access detection circuits 29 and 30 which are formed for example by digital comparators. Access detection circuit 29 compares the counted-down value from counter 25 with a predetermined reference value, such as zero, and outputs a high level signal to microcomputer 26 if the counted-down value is greater than zero indicating that the light beam is still located away from the target track, and a low level signal if the counted value is equal to zero indicating that the light beam has accessed the target track.

Similarly, access detection circuit 30 compares the counted-down value from counter 25 with a set reference value representing the number of tracks between the target track and a boundary track which is located at the end of ROM area RM and the beginning of adjacent recording area RD. The reference value is set by the microcomputer 26. Access detection circuit 30 produces a high level signal to microcomputer 26 if the counted-down value is greater than the set reference value indicating that the light beam is still located away from the boundary track, and a low level signal if the counted value is equal to the set reference value indicating that the light beam has accessed the boundary track.

The output of the velocity calculation circuit 21 is also applied to the microcomputer 26 so that microcomputer 26 can calculate the current radial velocity of the track crossing light beam. The control signals for the switches 15 and 24 are produced from the microcomputer 26 so that the operations thereof can be controlled by the microcomputer 26.

Next, the operation of the track access device of FIG. 1 is explained. To simplify the explanation, it is assumed that the light beam is moved from the recording area to the ROM area during the track access operation.

Before the track access operation, switch 15 is on and switch 24 is off whereby the tracking control is carried out. Thus, the light beam follows along a track in the recording area.

Furthermore, at this time, the offset switch signal applied to offset adding circuit 50 from microcomputer 26 is a low level signal. Thus, the offset adding circuit 50 adds a zero offset amount to the tracking error signal. Accordingly, the tracking error signal obtained from the recording area is as shown in FIG. 7(b) producing no offset.

Moreover, at this time, the gain switch signal applied to the gain switch circuit 42 from the microcomputer 26 is a low level signal. Thus, the gain switch circuit 42 is set to have a lower amplification ratio (standard amplification ratio).

Furthermore, at this time, the reference velocity signal applied to the reference velocity generator 27 from the microcomputer 26 is set at a high level $RV_1$. Also, the control signal applied to switch 45 in the binary circuit 43 from the microcomputer 26 is set at low level to turn switch 45 on. As a result, the hysteresis of the hysteresis converter 46 is set at the smaller amount.

In order to start the track access operation, the address of the target track and the address of the boundary track are inputted to microcomputer 26. Although not shown in FIG. 1, microcomputer 26 is coupled with a track address reader which reads the address of the track at which the light beam is presently located. Therefore, the microcomputer 26 is further inputted with the address of a starting track from which the track access operation starts. With the use of this information, the microcomputer 26 presets the track difference between the track access starting track and the target track into counter 25. Furthermore, microcomputer 26 inputs the track address difference between the target track and the boundary track into the access detection circuit 30 as a reference value.

Then, responsive to an instruction signal from microcomputer 26, switch 15 turns off and switch 24 turns on to move the light beam toward the target track to thereby start the track access operation. During the track access operation, counter 25 counts down by one each time the track crossing signal produced from the edge detection circuit 49 is inputted. Therefore, the counted value of counter 25 during the track access represents the distance between the current position of the light beam and the target track. The reference velocity generator 27 storing a table or graph of FIG. 6 receives the counted value from counter 25 and produces a reference velocity $RV_1$ corresponding to the counted value. Therefore, during the track access operation, the reference velocity corresponding to the current position of the light beam is applied to D/A converter 28. Thus, the track access operation is carried out quickly and smoothly, such that the reference velocity becomes smaller as the distance to the target track becomes shorter.

Furthermore, as described above, the reference velocity generator 27 can produce one of the two different reference velocities $RV_1$ and $RV_2$ in accordance with the instructions obtained from microcomputer 26. The first reference velocity $RV_1$ is for the recording area RD and is produced when the instruction signal from the microcomputer 26 is of a high level, and the second reference velocity $RV_2$ is for the ROM area and is produced when the instruction signal from microcomputer 26 is of a low level.

As the light beam moves in the recording area RD and when the counted value of counter 25 is still larger than a predetermined value, the reference velocity $RV_1$ is set at a constant velocity $V_{maxh}$ which denotes a limit for avoiding adverse effects due to the dynamic range restrictions of the velocity control. Furthermore, as the light beam moves in the ROM area RM and when the counted value of counter 25 is larger than a predetermined value, the reference velocity $RV_2$ is set at a constant reference velocity $V_{maxl}$ which denotes a limit for avoiding adverse effects due to the deterioration of the tracking error signal caused by pits.

The output signal of the reference velocity generator 27 is converted to an analog form by D/A converter 28 and is applied to the differential amplifier 23 to provide a reference velocity signal for the velocity control. As a result, by the velocity control, the light beam moves at a radial velocity approximately equal to the reference velocity. Therefore, as the light beam moves towards the target track, the counted value of counter 25 decreases, and the moving velocity of the light beam decreases accordingly as the light beam approaches the target track.

During the track access, the counted value of the counter 25 is compared in the access detection circuits 29 and 30 with respective reference values. The access detection circuit 30 produces a low level signal to microcomputer 26 when the counted value of the counter 25 become equal to the value set by the microcomputer 26 representing a distance between the starting track and the boundary track, and a high level signal during all other times.

Thus, when the light beam has passed the recording area RD and enters the ROM area RM, the output of the access detection circuit 30 becomes a low level. When the output of the access detection circuit 30 produces a low level signal, microcomputer 26 immediately switches the offset switch signal applied to offset adding circuit 50 to a high level signal, the gain switch signal applied to gain switch circuit 42 to a high level signal, the control signal applied to switch 45 to a high level signal, and the instruction signal applied to reference velocity generator 27 to a low level signal.

Accordingly, when the offset switch signal becomes a high level, the offset adding circuit 50 adds the offset amount $-V_2$ to the tracking error signal. As a result, the offset generated by the entering of the light beam into the ROM area is counterbalanced.

When the gain switch signal becomes a high level, gain switch circuit 42 is switched to the high amplification ratio for amplifying the tracking error signal to a greater degree than the amplification of the tracking error signal effected during the time the light beam is moving in the recording area.

The ratio of the high amplification ratio to the low amplification ratio is set so as to become equal to the reciprocal of the ratio of the tracking error signal amplitude obtained in the recording area to that obtained in the ROM area in order to generally compensate the signal amplitude reduction in the ROM area.

Therefore, by the offset adding circuit 50 and gain switch circuit 42, the offset and amplitude of the tracking error signal inputted to the binary circuit 43 during the track access and the track control in the ROM area become approximately equal to those observed in the recording area. Thus, it is possible to the prevent binary circuit 43 from failing to produce an output signal in response to each crossing of the track due to the effects of pits in the ROM area.

Furthermore, when the control signal from the microcomputer 26 becomes a high level, switch 45 is turned off. As a result, the hysteresis amount of the hysteresis comparator 48 becomes larger and the occurrence of the pulse noise signal generated by the existence of pits in the ROM area can be prevented.

The reference velocity generator 27 outputs a reference velocity $RV_2$ having a with reduced maximum value for the ROM area as shown by the dotted line in FIG. 6 in accordance with the instruction signal from the microcomputer 26. As a result, the light beam moves in the ROM area at a lower velocity than in the recording area. Therefore, the misformation of a pulse in the tracking error signal due to the effect of pits caused by an excessively high moving velocity of the light beam can be prevented.

Then, when the light beam reaches the target track in the ROM area, counter 25 has counted down to zero and therefore, access detection circuit 29 produces a low level signal to microcomputer 26. Thereupon, microcomputer 26 immediately turns off the switch 24 and turns on the switch 15 so as to restart the tracking control.

At this time, since the offset adding circuit 50 and the gain switch circuit 42 are still maintained in the adding state and high amplification state, respectively, the offset and loop gain of the tracking control system are made approximately equal to those in the recording area. Therefore, the failure in the proper tracking control caused by the occurrence of is offset and decrease in loop gain of the tracking control system does not take place, and a smooth tracking control pull in is effected and the track access operation is ended.

By the above-mentioned arrangement, even in a disk having a recording area and a ROM area, an abnormal velocity variation of the light beam caused by the erroneous velocity detection due to the pits in the ROM area can be prevented. Furthermore, the increase in the access time caused by the erroneous detection of the light beam position due to the pits in the ROM area can be also prevented. Moreover, the failure in the pull-in of the tracking control into the target track due to the offset and amplitude variation of the tracking error signal in the ROM area can be prevented. As a result, even in a disk having both a recording area and ROM area, the track access to a target track can be effected stably and rapidly.

In the above description, the track access is explained as effected from the recording area to the ROM area, but track access in the opposite direction, i.e., from the ROM area to the recording area, can also be carried out stably and rapidly with the arrangement according to the present invention as explained below.

Before the track access operation from the ROM area to the recording area, the offset switch signal from the microcomputer 26 to the offset adding circuit 50 is of a high level, and thus, the offset adding circuit 50 adds an offset of $-V_2$. Furthermore, the gain switch signal to the gain switch circuit 41 is of a high level and thus, the gain switch circuit 41 is switched to the high amplification state. Moreover, the instruction signal from the microcomputer 26 to the reference velocity generator 27 is set at a low level and thus, the reference velocity generator 27 outputs a reference velocity $RV_2$ for ROM area as shown by the dotted line in FIG. 6. The control signal from microcomputer 26 to switch 45 in the binary circuit 43 is set at a high level and thus, switch 45 is off. As a result, the larger hysteresis amount is set in the hysteresis comparator 46. Also, microcomputer 26 inputs the address difference between the present track and the target track in the access detection circuit 29 and between the target track and the boundary track in the access detection circuit 30.

After the start of the track access operation and when the light beam has passed the ROM area and reached the recording area, the output of the access detection circuit 30 becomes a low level so that microcomputer 26 immediately produces a low level offset switch signal to offset adding circuit 50, a low level gain switch signal to gain switch circuit 42, a low level control signal to switch 45, and a high level instruction signal to reference velocity generator 27.

As a result, offset adding circuit 50 is set to zero offset, since there is no offset being observed in the tracking error signal. Furthermore, gain switch circuit 42 is set in the low amplification state. Therefore, the offset and amplitude of the signal applied to the binary circuit 43 in the recording area become approximately equal to those observed in the ROM area. Also, switch 45 is turned on and thus, the smaller hysteresis amount is set in the hysteresis comparator 46. Furthermore, since the reference velocity generator 27 produces the reference velocity $RV_1$ having an increased maximum value shown by the solid line in FIG. 6, the time required for the track access can be shortened.

Then, when the light beam reaches the target track in the recording area, the access detection circuit 29 produces a low level signal. Thereupon, microcomputer 26 turns off switch 24 and turns on switch 15 to terminate the track access operation and to restart the tracking control. Since the offset adding circuit 50 and the gain switch circuit 42 are, as described above, in states for matching the offset and amplitude of the tracking error signal in the recording area, the offset and loop gain of the tracking control system are approximately equal to those in the ROM area. Accordingly, the failure in the pull-in to the tracking control arising from the occurrence of the offset and decrease in gain of the tracking control system does not take place, and the transition to the tracking control can be effected stably.

Although the above description is directed to a case using a disk having one recording area and one ROM area, it is possible to use the track access device of the present invention with the use of a disk having a plurality of recording areas and a plurality of ROM areas by adding one or more access detection circuits similar to the access detection circuit 30 which can set from microcomputer 26 a reference value representing the number of tracks between the target track and the boundary track, and yet obtain a similar effect.

Furthermore, the above description is directed to a case using an on-land disk wherein a band area enclosed by adjacent pregrooves is a track where information recording is effected. However, a similar effect can be obtained on an in-groove disk wherein pits are formed by the existence or non-existence of pregrooves and information recording is effected on pregrooves.

Furthermore, in the above described embodiment, the edge detection circuit 49 is arranged to detect the light beam crossing at the mid point of a track, such as shown in FIG. 2(d). However, it is clear that a similar effect can be obtained even when it is arranged to detect the light beam crossing the middle point of a track and the middle point between tracks, such as shown in FIG. 2(e). In this case, the velocity calculation circuit 21 calculates the radial velocity DV of the light beam from the measurement value of timer 20 by the following equation:

$$DV = P/(DT*2),$$

where P is a distance between tracks, and DT is a measurement value of timer 20.

Furthermore, before the track access operation, two times the track difference between the starting track and the target track is preset at the counter 25 by the microcomputer 26. Furthermore, in the access detection circuit 30, two times the track difference between the target track and the boundary track is set before the track access operation.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. In a data recording/reproducing device having a pickup means for recording/reproducing information in tracks formed on a recording medium, each of said tracks being located in one of concentric first and second areas of the recording medium in which one of said concentric first and second areas is located outside a periphery of the other of said concentric first and second areas, a track access device for moving said pickup means from a starting track to a target track comprising:
   means for moving said pickup means in a direction crossing said tracks;
   means for generating an analog signal representing the crossing of said tracks by said pickup means;
   position detecting means for detecting whether said pickup means is located in said first area or in said second area of said recording medium;
   amplifier means for amplifying said analog signal at a first amplification ratio when said position detecting means detects that said pickup means is in said first area, and at a second amplification ratio which is different from said first amplification ratio when said position detecting means detects that said pickup means is in said second area, wherein the thus amplified analog signal representing the crossing of said tracks in said first area has approximately a same amplitude as the analog signal representing the crossing of said tracks in said second area.

2. A track access device as claimed in claim 1, wherein said tracks in said first area are formed by a planar surface, and said tracks in said second area are formed by an uneven surface and wherein said second amplification ratio is greater than said first amplification ratio.

3. A track access device as claimed in claim 2, further comprising a binary circuit means for changing said amplified analog signal to a digital signal.

4. A track access device as claimed in claim 3, wherein said position detecting means comprises:
   counter means for counting said binary signal to obtain a count of the number of tracks crossed by said pickup means;
   first setting means for setting a boundary track data indicative of the location of a boundary track located adjacent a boundary between said first and second areas; and
   first access detecting means for determining that said pickup means has reached said boundary track when said count of said counter means coincides with said boundary track data.

5. A track access device as claimed in claim 4, wherein said position detecting means further comprises:
   second setting means for setting a target track data indicative of the location of said target track; and
   second access detecting means for determining that said pickup means has reached said target track when said count of said counter means coincides with said target track data.

6. In a data recording/reproducing device having a pickup means for recording/reproducing information in tracks formed on a recording medium, each of said tracks being located in one of concentric first and second areas of the recording medium in one of said concentric first and second areas is located outside a periphery of the other of said concentric first and second areas, a track access device for moving said pickup means from a starting track to a target track comprising:
   means for moving said pickup means in a direction crossing said tracks;
   means for generating an analog signal representing the crossing of said tracks by said pickup means;
   position detecting means for detecting whether said pickup means is located in said first area of in said second area of said recording medium;
   reference velocity setting means for setting a reference velocity of said pickup means, said reference velocity set to a first reference velocity when said position detecting means detects that said pickup means is in said first area, and set to a second reference velocity which is different from said first reference velocity when said position detecting means detects that pickup means is in said second area.

7. A track access device as claimed in claim 6, wherein each of said first and second reference velocities becomes smaller as said pickup means moves towards said target track.

8. A track access device as claimed in claim 6, wherein said first reference velocity is greater than said second reference velocity.

9. A track access device as claimed in claim 6, wherein said position detecting means comprises:
   counter means for counting the number of tracks crossed by said pickup means;
   first setting means for setting a boundary track data indicative of the location of a boundary track located adjacent a boundary between said first and second areas; and
   first access detecting means for determining that said pickup means has reached said boundary track when the number of tracks counted by said counter means coincides with said boundary track data.

10. A track access device as claimed in claim 9, wherein said position detecting means further comprises:
    second setting means for setting a target track data indicative of the location of said target track; and
    second access detecting means for determining that said pickup means has reached said target track when the number of tracks counted by said counter means coincides with said target track data.

11. In a data recording/reproducing device having a pickup means for recording/reproducing information in tracks formed on a recording medium, each of said tracks being located in one of concentric first and second areas of the recording medium in which one of said concentric first and second areas is located outside a periphery of the other of said concentric first and second areas, a track access device for moving said pickup means from a starting track to a target track comprising:
    means for moving said pickup means in a direction crossing said tracks;
    means for generating an analog signal representing the crossing of said tracks by said pickup means;
    position detecting means for detecting whether said pickup means is located in said first area or in said second area of said recording medium;
    binary circuit means, having a hysteresis comparator, for changing said analog signal to a digital signal, said hysteresis comparator having a hysteresis amount defining a difference between comparator levels of said hysteresis comparator, said hysteresis amount set to a first hysteresis amount when said position detecting means detects that said pickup means is in said first area, and set to a second hysteresis amount which is different from said first hysteresis amount when said position detecting means detects that said pickup means is in said second area.

12. A track access device as claimed in claim 11, wherein said second hysteresis amount is greater than said first hysteresis amount.

13. A track access device as claimed in claim 11, wherein said position detecting means comprises:

counter means for counting said digital signal to obtain a count of the number of tracks crossed by said pickup means;

first setting means for setting a boundary track data indicative of the location of a boundary track located adjacent a boundary between said first and second areas; and first access detecting means for determining that said pickup means has reached said boundary track when the number of tracks counted by said counter means coincides with said boundary track data.

14. A track access device as claimed in claim 13, wherein said position detecting means further comprises:

second setting means for setting a target track data indicative of the location of said target track; and second access detecting means for determining that said pickup means has reached said target track when the number of tracks counted by said counter means coincides with said target track data.

15. In a data recording/reproducing device having a pickup means for recording/reproducing information in tracks formed on a recording medium, each of said tracks being located in one of concentric first and second areas of the recording medium in which one of said concentric first and second areas is located outside a periphery of the other of said concentric first and second areas, a track access device for moving said pickup means from a starting track to a target track comprising:

means for moving said pickup means in a direction crossing said tracks;

means for generating an analog signal representing the crossing of said tracks by said pickup means;

position detecting means for detecting whether said pickup means is located in said first area of in said second area of said recording medium;

offset adding means for adding a predetermined DC offset voltage to said analog signal when said position detecting means detects that said pickup means is in said second area to counterbalance an offset amount observed in said analog signal relative to the analog signal obtained when said pickup means is in said first area.

16. A track access device as claimed in claim 15, further comprising an amplifying means for amplifying said analog signal and a binary circuit means for changing the thus amplified analog signal to a digital signal.

17. A track access device as claimed in claim 16, wherein said position detecting means comprises:

counter means for counting said digital signal to obtain a count of the number of tracks crossed by said pickup means;

first setting means for setting a boundary track data indicative of the location of a boundary track located adjacent a boundary between said first and second areas; and first access detecting means for determining that said pickup means has reached said boundary track when the number of tracks counted by said counter means coincides with said boundary track data.

* * * * *